(12) United States Patent
Rossides

(10) Patent No.: US 7,984,078 B2
(45) Date of Patent: *Jul. 19, 2011

(54) METHOD AND SYSTEM FOR PROVIDING IMPROVED ANSWERS

(76) Inventor: Michael T. Rossides, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/657,936

(22) Filed: Jan. 29, 2010

(65) Prior Publication Data
US 2010/0138381 A1   Jun. 3, 2010

Related U.S. Application Data

(63) Continuation of application No. 11/903,230, filed on Sep. 20, 2007, now Pat. No. 7,657,551.

(51) Int. Cl.
*G06F 17/30* (2006.01)
(52) U.S. Cl. .................................. 707/803; 705/1.1
(58) Field of Classification Search ............ 707/999.001, 707/999.002, 705, 942, 1.1, 803, 802, 804
See application file for complete search history.

(56) References Cited

U.S. PATENT DOCUMENTS

| 6,131,085 | A  | * | 10/2000 | Rossides ................... 705/1.1 |
| 6,443,841 | B1 | * | 9/2002  | Rossides ................... 463/25 |
| 7,351,149 | B1 | * | 4/2008  | Simon et al. .............. 463/42 |
| 2005/0008139 | A1 | * | 1/2005 | Beckstrom et al. ...... 379/265.01 |

* cited by examiner

*Primary Examiner* — Angela M Lie

(57) ABSTRACT

Disclosed is a method and system for ranking answers supplied by user authors in an online database. A first author enters a first answer under a question. The answer is ranked #1 for output under that question. Then a second author enters a second answer under the same question. The second author also enters a bet claiming that her answer is better than the first answer. If the first author declines the bet, the second answer becomes ranked #1 for output under the question. If the first author accepts the bet, the bet is decided by a judge. The judge enters her decision into the answer database system.

If the judge finds that the first author's answer is better than the second author's, then the first author's answer remains ranked first under the question; if the judge finds that the second author's answer is better, then the second author's answer replaces the first author's answer as the #1 ranked answer under the question.

16 Claims, 1 Drawing Sheet

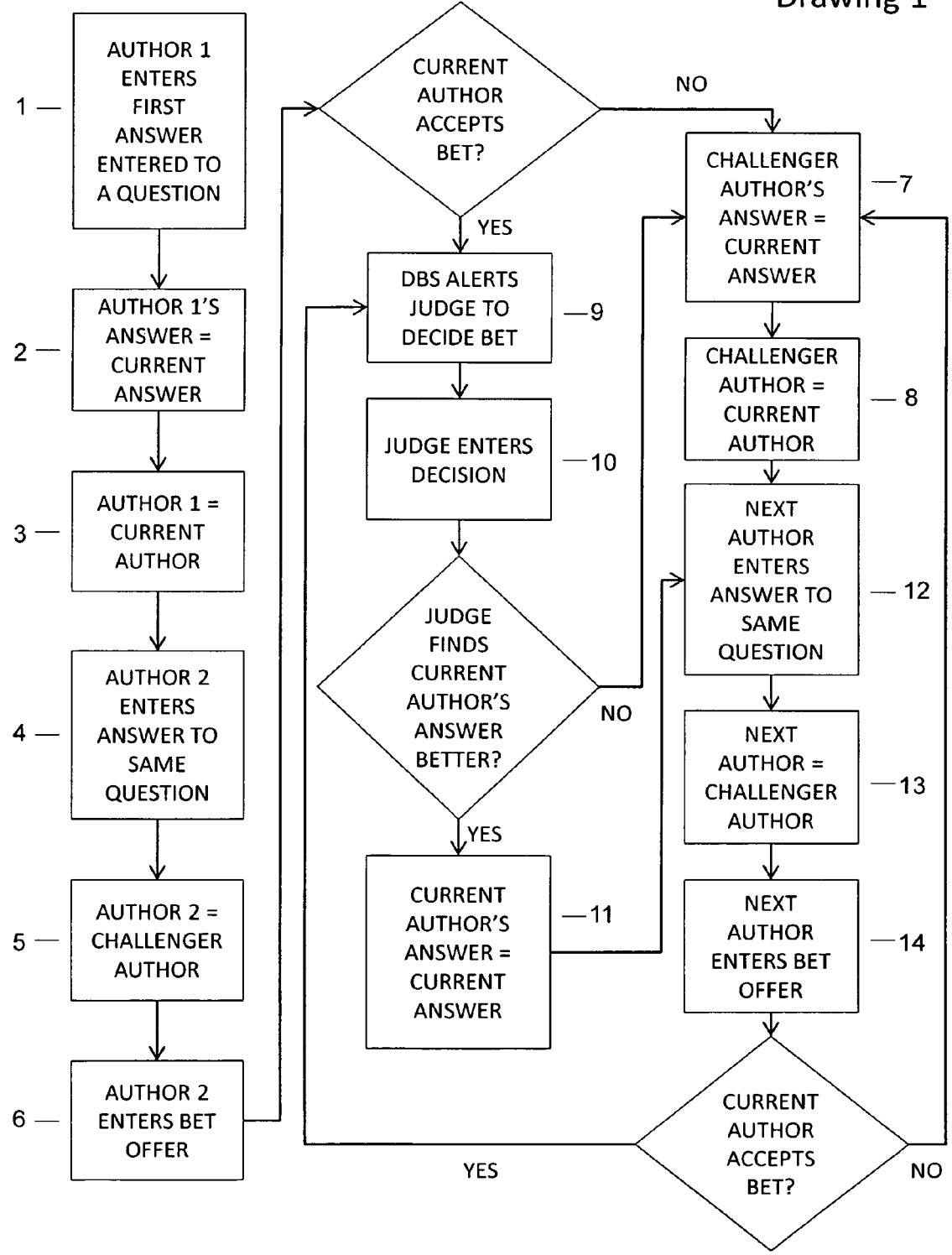
Drawing 1

METHOD AND SYSTEM FOR PROVIDING IMPROVED ANSWERS

CROSS-REFERENCES TO RELATED APPLICATIONS

This application is a continuation of application Ser. No. 11/903,230, filed on Sep. 20, 2007 now U.S. Pat. No. 7,657,551.

This application was preceded by, and claims benefit of, disclosure document 524359, filed on Jan. 13, 2003, entitled Method for Improving Answers in a Pay-for-Answers Database System.

This application was also preceded by, and claims benefit of, provisional application 60/542,392, filed on Feb. 6, 2004, entitled Method for Improving Answers in a Pay-for-Answers Database System.

This application makes reference to U.S. Pat. No. 6,131,085, entitled Answer Collection and Retrieval System Governed by a Pay-off Meter.

STATEMENT REGARDING FEDERALLY SPONSORED RESEARCH

Not applicable.

REFERENCE TO SEQUENCE LISTING

Not applicable.

BACKGROUND OF THE INVENTION

The invention relates to online database methods and systems for providing, evaluating and retrieving answers.

Online answer databases have arisen in which ordinary users contribute answers for free. Wikipedia is an example. Online answer databases have also arisen in which ordinary users contribute answers for pay. Google Answers (now defunct) is an example. U.S. Pat. No. 6,131,085 describes a pay-for-answers database method and system. In both types of systems, various problems impede users from improving answers. One basic problem is the labor cost of judging the quality of answers. A second basic problem is that there is no good method for measuring the quality of an answer; so therefore, disputes arise as to whether and how much one answer improves on another.

Current methods for improving answers in databases include:
- Having a special class of users who have special rights to improve answers
- Having a special class of users who judge the quality of answers
- Incorporating user feedback regarding answers
- Using mechanistic rules for evaluating and ranking answers.

This application discloses a novel method that reduces the costs of disputes about whether one answer is an improvement over another. In this method, an author of an answer bets that her answer is better than a higher ranked answer by another author. The potential financial penalty of the bet encourages honesty by both authors as to who has supplied the better answer. The challenger author's answer replaces the higher ranked answer if the author of the higher ranked answer declines to bet. This method can be adapted to allow consumers of answers to also bet and thereby affect the ranking of answers.

The inventor does not know of this method being proposed for any answer system. U.S. Pat. No. 6,131,085 stated that betting methods could be used for quality control of answers, but the patent did not supply details.

BRIEF SUMMARY OF THE INVENTION

Disclosed is a method and system for ranking answers in an online database, and for facilitating the improvement of those answers by authors.

A first author enters a first answer under a question. The answer is ranked #1 for output under that question. Then a second author enters a second answer under the same question. The second author also enters a bet offer claiming that her answer is better than the first answer. If the first author declines the bet offer, the second answer becomes ranked #1 for output under the question. If the first author instead accepts the bet offer, a bet is struck and, the bet is then decided by a judge.

The judge enters her decision into the answer database system.

If the judge finds that the first author's answer is better than the second author's, then the first author's answer remains ranked #1 under the question; if the judge finds that the second author's answer is better, then the second author's answer replaces the first author's answer as the #1 ranked answer under the question.

BRIEF DESCRIPTION OF THE DRAWINGS

Drawing 1 shows a flowchart of the sequence of the invention.

DETAILED DESCRIPTION OF THE INVENTION

Contents

Preface: Problems that the Invention Addresses
Definitions
I. Core Invention
II. Invention Including Method for Comparing More than Two Answers at a Time
III. Invention Including Method for Enabling Consumers Users to Bet
IV. Invention Including Method for Dividing Royalties Preface: Problems that the Inventive Method Addresses In an online database system (DBS) in which users supply answers to questions, more than one answer can be supplied to a question. So, it is necessary to determine whether one answer improves on another, in order to rank those answers for output in response to the question.

For example, an answer DBS may contain answers by different authors to the question: How do clocks work? If so, the DBS requires a procedure for determining whose answer is better for output in response to the question. The answers can be considered competing answers.

Now, if the authors of the competing answers are allowed to judge which answer is better, disputes will often arise.

In a pay answer DBS, the potential for disputes may be greater than in a free answer DBS because an author who receives royalties has a financial incentive to claim that his answer is better than a competing answer.

Therefore, in both a free answer and a pay answer DBS, it can be desirable to employ a neutral judge to evaluate competing answers.

Yet, hiring a neutral a judge is costly.

This cost problem can be thought of as two problems. One problem is how to reduce the cost of judging. The second problem is how to encourage authors to be honest about whether their answers are better than competing answers, thereby reducing disputes and the need for judging.

The invention provides a solution to these two problems, and in so doing, provides a solution to two other important problems:

1. which competing answer to output in response to a question
2. how to enable improvements to be made to the answers in an answer DBS.

DEFINITIONS

The definitions below are not exhaustive. They are supplemented throughout this Description.

User Supplied Answers Database System (Answer DBS)

An online database system in which users supply answers to correspond to questions entered by other users. The answers are stored to correspond to the questions, and are outputted in response to the questions being entered. Users may also supply the questions to the answer DBS.

User Supplied Free Answers Database System (Free Answer DBS)

An answer DBS in which users supply and retrieve answers for free.

Author

A user who supplies an answer to an answer DBS.

Consumer

A user who enters a question seeking an answer, a consumer of answers.

User Supplied Pay-for-Answers Database System (Pay Answer DBS)

An answer DBS in which users buy answers supplied by authors who are paid royalties.

Judge

A user who decides whether one answer is better than another. A judge may also decide how much better one answer is than another. "A judge" can mean a single judge or a panel of judges or a panel of consumer users who act in the role of a judge.

Current Answer

The answer that is output first by the answer DBS in response to a consumer entering a question seeking an answer. The current answer may be the only answer that is output in response to a question. The current answer is ranked #1 under a question in the sense that it is output at the top of a list of answers in response to a question. If a list is not used, then the current answer is the answer that the DBS outputs preferentially in response to a question.

Current Author

The author of the current answer.

Higher Ranked Answer and Lower Ranked Answer

A first answer that is outputted ahead of a second answer in response to a question is called higher ranked, relative to the second answer, which is lower ranked relative to the first answer.

Challenger Answer

An answer that an author supplies to correspond to a question, and which the author claims is better than the current answer, or than a higher ranked answer, or than an equally ranked answer.

Challenger Author

The author of the challenger answer.

A Bet

An agreement between or among people who take opposite sides of a controversy and risk money such that each will pay the other an amount of money, the amounts depending on: (a) which side each has taken in the controversy, (b) the outcome of the controversy and (c) the money-at-stake and division-of-money rules that apply to the bet (an example is an even-odds bet, but bets employed in the invention are not limited to even-odds bets or odds type bets).

A Bet Offer

An offer by a user to engage in a bet with another user or users.

Betting Line

A number that reflects the current market sentiment about a bet controversy. The number is generated from bets about the controversy. The concept of a betting line applies a wide variety of types of bets. Betting lines can be expressed as the odds offered, as a point spread, as the price of a bet security or, as the amount of money wagered on each outcome of a bet. A betting line that can be employed in the invention is not limited to these types of lines. For purposes of the invention, the key aspect of a betting line is that it is generated from the betting actions of a group of people and, further, enables the ranking of the answers that are the subjects of the bets, just as horses can be ranked in a race according to the betting line.

Improvement to an Answer (Also Called an Improvement or Improvement Answer)

Anything that improves an answer, from a typo correction to a completely new alternative.

I. Core Invention

Specialized terms, such as current answer, are used below. For definitions, see above.

Some of the steps given below are stated for clarity's sake and are not strictly necessary. Those skilled in the art will see better ways to arrange the steps, excise unnecessary steps, and substitute equivalent steps and operations to arrive at the same basic method disclosed below. The sequence laid out below is not meant to limit the scope or equivalent variations on the basic method or arrangement of the invention.

The core invention is comprised of the following elements: an online computer database system for supplying and retrieving answers (answer DBS). This answer DBS includes processors, memory, online input/output, software, and a user interface for:

Creating user accounts, including accounts for funds
Entering a question and supplying a corresponding answer
Entering a question and retrieving a corresponding answer
Entering a bet offer, which can be directed at a specified user or audience
Accepting a bet offer
Providing money to fund a bet offer and agreement
Entering a bet decision.

The inventive method is comprised of the following steps that the answer DBS executes. Drawing 1 is a flowchart that shows the sequence of these steps.

The method begins with the answer DBS presenting its interface to users.

When a first author, Frank, enters a question and supplies 1 the first answer to that question, the answer DBS:

stores the answer to correspond to the question
designates 2 the answer as the current answer
designates 3 the author as the current author. (This step is not necessary, for it adds no new information. It is included for clarity's sake in describing the inventive method.)

Then, when another author, Sue, enters the same question and supplies 4 a different answer, the answer DBS:
- stores the answer to correspond to the question
- designates Sue's answer as a challenger answer in relation to the current answer
- designates 5 Sue as the challenger author in relation to Frank and Frank's answer
- requires Sue to enter a bet offer, directed at Frank, claiming that her answer to the question is better than his.

Sue enters 6 the bet offer, directed at Frank, claiming that her answer is better than Frank's. As part of her bet offer, Sue provides an amount of money to fund the bet offer, as required by the meta-rules of the answer DBS.

The answer DBS:
- stores the bet offer, associating it with a bet controversy regarding which answer is better, the current answer (Frank's) or the challenger answer (Sue's)
- registers the amount of money Sue has put at stake.

The answer DBS alerts Frank about Sue's bet offer and starts an acceptance deadline clock.

If Frank does not accept the bet offer within the period of the acceptance clock, the answer DBS:
- declares that Frank has declined the bet offer
- associates the declaration with the controversy between Frank's and Sue's answer
- takes away 7 the current answer designation from Frank's answer
- designates 7 Sue's answer as the current answer
- designates 8 Sue as the current author.

If Frank accepts the bet within the period of the acceptance clock, and provides money to fund his acceptance, the answer DBS:
- stores the acceptance
- associates the acceptance with the controversy concerning Frank's and Sue's answers
- registers the amount of money Frank has put at stake
- alerts 9 a judge to decide the bet (the answer DBS includes a process for alerting a judge or a panel of judges).

The bet is decided by the judge who enters 10 a bet decision into the answer DBS.

The answer DBS stores the decision, associating it with the controversy and with Frank's and Sue's answer.

If the judge finds that Frank's answer is better, the answer DBS maintains 11 Frank's answer as the current answer; if the judge finds that Sue's answer is better, then the answer DBS takes away 7 the current answer designation from Frank's answer, and designates 7 Sue's answer as the current answer (replacing Frank's answer in this respect), and designates 8 Sue as the current author.

The winner of the bet owes the loser the amount of money specified by the bet terms. The answer DBS transfers money from the loser's account to the winner's account, as specified by the bet terms.

Competing authors involved in a bet may share the cost of judging or the loser may pay the judge's costs. Accordingly, the answer DBS can transfer a portion of the money at stake to the judge. Alternatively, a fee outside the bet may be paid to the judge by one or both authors. In any case, the answer DBS includes elements and steps for receiving judging fees from either or both authors and transferring the money to the judge. Alternatively, the judges may be volunteers, especially in a free answer DBS.

When another author, the "next" author, enters the same question and supplies 12 a different answer than the current answer, the process above repeats:

The DBS:
- designates this next author's answer as the challenger answer in relation to the current answer
- designates 13 this next author as the challenger author in relation to the current author
- requires this next author to enter a bet offer, directed at the current author, claiming that the challenger answer to the question is better than the current answer.

The challenger author enters 14 the bet offer, and process continues as stated.

The steps above comprise the core inventive method.

Note that if a current answer is displaced by a challenger answer, the displaced answer does not have to disappear. The answer DBS can keep the answer and can enable the author to challenge the new current answer, somewhat like appealing a judge's decision to another court.

Benefits of the Invention

The method employs a betting process that creates a potential or actual bet between competing authors regarding the relative merits of their answers to a question. If the money at risk in the bet is substantial, the penalty of losing can encourage the authors to be honest about those merits. In other words, the method can discourage exaggerated claims of improvement by challenger authors, while encouraging current authors to acknowledge the improvements of challenger authors. Judging costs are reduced because a judge becomes involved only when competing authors are willing to engage in a bet. In these ways, the method can facilitate the evolution of answers in an answer DBS.

Invention as Part of a Free Answer DBS

The core method can be incorporated into a free answers DBS.

Invention as Part of a Pay Answer DBS Including Steps for Assigning Royalties

The core method disclosed above can be incorporated into a pay answer DBS, like the system described in U.S. Pat. No. 6,131,085.

When implemented within a pay answer DBS, the royalty stream for an answer is influenced or changed entirely when the current answer is replaced by the challenger answer. So, where the invention is incorporated into a pay answer DBS, the DBS will include elements and steps for:
- assigning some or all of the royalties for the new current answer to the new current author, according to the royalty rules formula implemented within the answer DBS.

The royalty rules in a pay answer DBS can, of course, vary widely. Specific royalty rules are not the subject of this Description. However, Part IV below discloses how an embodiment of the invention can address the problem of how to divide royalties between two authors who have contributed to the evolution of an answer.

How a Judge is Alerted and Asked to Decide the Bet

This Description does not add to the art of calling a judge to decide a case. The system can incorporate various methods for calling a judge to decide an answer controversy.

In the embodiment above, the answer DBS alerts a judge after a bet is accepted. The time period that passes between the acceptance and the alerting can be set by a default. Alternatively, the system can enable one of the parties in the bet to ask for a judge to decide the bet.

The meta-rules of the system can require that one or both parties pay a judging fee in order to alert a judge to decide the bet.

Steps for Adding Reasons to a Bet

The invention can also include steps for enabling an author (or any user) who bets on the merit of one answer over a competing answer to enter, for display, reasons why she thinks the answer she is betting on is better than the competing answer. Accordingly, the answer DBS can include steps for storing reasons associated with a bet and displaying those reasons with an author's answer and with the bet terms.

Steps for Gathering User Feedback Before the Bet is Accepted

In many answer DBS's, users who consume the answers may be the ones to determine whether one answer is better than another—a panel of these users may judge competing answers. Therefore, before an author has to risk money that his answer is better than a competing answer, it can be useful to enable the author to gather the opinion of a sample of consumer users.

Hence, the answer DBS can include steps for enabling an author to ask the opinion of certain consumers about the merits of his answer compared to the competing answer. Accordingly, an answer DBS incorporating the invention can also include process steps for enabling the current and challenger authors to solicit the opinions of consumer users before a bet agreement has been made regarding which answer is better.

Steps for Using Feedback after the Bet is Accepted

It can also be convenient to enable either author in a bet agreement to retract their bets based upon information received from consumers (or other information gleaned before the judge's decision). Accordingly, as an enhancement to the invention, the answer DBS can include steps for enabling either author in a bet agreement to retract a bet offer (in the case of the challenger author) or bet acceptance (in the case of the current author). The answer DBS can also include steps for assessing a penalty for the retraction.

II. Invention Including Method for Comparing More than Two Answers at a Time

The method above can be enhanced by adding steps for enabling more than one author to challenge a current answer. In cases where more than one author wants to challenge the current answer, it can be more efficient to have all the authors make a bet as to whose answer is the best.

Accordingly, the answer DBS can include steps for comparing more than two competing answers and subjecting their authors to the honesty test of a bet. In such a bet, the controversy is about which answer will be judged best of all the answers, as in a horse race.

The answer DBS can include the following steps, executed when an author supplies a challenger answer to a current answer:
- store the answer to correspond to the question that the current answer corresponds to
- designate the answer as a challenger answer in relation to the current answer, and the author as a challenger author, in relation to the current author
- start a submission deadline clock setting a time limit for additional answers by other authors to the same question
- if any other authors submit answers to the same question, designate each of those answers as a challenger answer, and each of their authors as a challenger author
- alert each challenger author and the current author about all the answers supplied for the same question
- require every challenger author to enter a bet offer claiming that his answer is better than the current answer and better than the other challenger answers
- register funds entered by the challenger author(s) to cover their bet offer(s),
- when the submission deadline clock runs out, start a bet acceptance deadline clock (these deadlines can run concurrently—the bet acceptance clock does not have to run directly after the submission clock)
- if the current author does not accept the bet offer(s) then the answer DBS alerts a judge and tells the judge that the current answer is not a subject of the bet and will be replaced by the winning challenger answer
- if the current author accepts the bet offer(s) then the answer DBS alerts a judge and tells the judge that the current author has accepted the bet
- the answer DBS presents the judge with the competing answers The judge enters a decision as to which answer is best. Then, the answer DBS:
- stores the decision and designates the winning answer as the current answer, and the author of that answer as the current author
- transfers money at stake in the bets from the losing authors to the winning author in accordance with the terms of the bets.

III. Invention Including Method for Enabling Consumer Users to Bet

The inventive method may be enhanced to include interface elements and steps so that any user of the answer DBS can supply an answer to be the current answer, even if the supplier is not the actual author of the answer.

The answer DBS can accordingly include steps to enable a user to find an existing answer in the answer DBS and submit it as the challenger answer to a current answer. In this situation, the user would be in the position of the challenger author, except that the user might not be due royalties and would not be cited or credited as the author. In other essential respects, the inventive method remains.

The answer DBS can incorporate incentive rules for rewarding users who are not actual authors but who put up challenger answers that replace current answers.

Just as the inventive method can include steps for enabling any user to take the betting place of challenger authors, the method can include steps for enabling any user to defend a current answer via a bet, even if the author of the answer is unwilling to defend it.

Enabling Any User to Bet about the Relative Merits of Answers

The inventive method and system can include elements and steps for enabling any user of the answer DBS to bet on which competing answer will win in a bet controversy.

Variation in which a Betting Line Provisionally Determines the Current Answer

In the inventive method, a challenger answer replaces a current answer when a current author declines to bet against the challenger author, or when a bet is struck and a judge determines that the challenger answer is better.

A potentially advantageous variation is to modify the method such that a challenger author can supply an answer to challenge the current answer, and then the answer DBS can enable any user, including the two authors, to bet on which answer a judge will choose as the better answer.

When more than two users make bet offers and/or bet agreements then the answer DBS can create a betting line regarding which answer will be judged best, the line being generated from the bet offers and bet agreements made regarding which competing answer is best.

The answer DBS can designate the answer that is favored according to the betting line as the current answer.

In this modification of the inventive method, the current answer changes dynamically according to which answer is favored in the betting line.

If more than two answers are the subject of a bet controversy, the method still applies—the answer DBS designates the answer favored by the line as the current answer.

Then, if and when the bet is settled by a judge's decision, the answer that the judge deems best is designated the current answer. It may be the answer most recently favored in the betting line, or it may be another answer.

IV. Method for Dividing Royalties

In a pay answer DBS, authors are paid royalties when their answers are purchased.

If more than one author can contribute to the evolution of a current answer, the pay answer DBS should have royalty division rules that define how royalties are to be divided between or among authors who have played a part in the current answer by supplying improvements to previous answers or improvements to the current answer.

Dividing royalties will usually involve subjective judgments that can create disputes.

For example, assume hypothetical royalty division rules that state:

If a challenger improves on a current answer, then it becomes the new current answer and royalties are divided as follows:

If a challenger answer improves on the old current answer by 50% or more, then the challenger author will be paid all the royalties from the sales of the new current answer.

If the challenger answer improves on the current answer by 10%-50%, the challenger author will be paid 10% of the royalties from the sales of the new current answer.

And if the challenger answer improves on the current answer by 10% or less, the challenger author will receive no royalties from the sales of the new current answer; royalties will continue to go to the previous current author.

This hypothetical example posits a scoring system that determines the division of royalties. Scoring answers is a subjective task that in most cases invites disputes.

So, as described above, a neutral judge may need to be invoked, in this case to decide how much a challenger answer improves on a current answer.

The inventive method described above can be enhanced to encourage authors to arrive at their own honest judgments of improvements and to reduce the need for neutral judging.

We assume a pay answer DBS including the following elements:

(1) An interface for entering an answer and an appraisal claim about how that answer improves on another specified answer
(2) A current answer
(3) An interface for entering challenger answers that may improve on the current answer
(4) Royalty rules for scoring improvements to an answer and for determining the amount or percentage of royalties that an author gets paid for an improvement to a current answer
(5) A judging procedure in which a judge determines how much a current answer has been improved by a challenger answer (an improvement), as defined by the royalty rules
(6) A penalty for an exaggerated assertion of an improvement to an answer by the author (supplier) of the improvement.

Embodiment for Dividing Royalties in a Pay Answer System

In this embodiment, when a challenger author supplies a challenger answer, she also supplies her opinion, her appraisal claim of how much of an improvement she has made according to the royalty rules in effect.

Accordingly, the answer DBS:
stores the appraisal claim along with the challenger answer
notifies the current author of the challenger answer and of the challenger author's claim of improvement
lets the current author contest the improvement by entering his appraisal of the challenger answer, such that the current author claims that the challenger answer is:
a. not an improvement or
b. not as much of an improvement as the challenger author claims.

If the current author does not contest the challenger answer, then the answer DBS:
designates the challenger answer as the current answer
assigns the challenger author the royalties she has claimed.

If the current author does contest the improvement, then the answer DBS lets the challenger author agree or disagree with the current author's appraisal of the improvement.

If the challenger author agrees with the current author's appraisal, the answer DBS:
sets the challenger author's royalty rate at what the current author has claimed, according to the royalty rules.

If the challenger author disagrees with the current author's appraisal, the answer DBS:
designates that a bet controversy is created:
At this point, the answer DBS alerts both authors to put up a sum of money to:
(a) pay to the author that wins the controversy
(b) pay for the judging costs and
If one of the authors fails to put up the money, the answer DBS:
designates the other author's claim as accepted
assigns and him/her the royalties he/she has claimed, as defined by the royalty rules.
If both authors put up the money then the answer DBS alerts a judge to decide the controversy by deciding the amount of the improvement, if any.
The judge enters his decision regarding the controversy.
The DBS stores the decision and replaces the current answer or not, in accordance with the decision, and assigns royalties to the "winning author," in accordance with the royalty rules.
If the challenger answer is judged an improvement, then the answer DBS replaces the current answer (even if it is not as great an improvement as claimed by the challenger author) and assigns royalties to the author in accordance with the royalty rules.

Court costs may be paid out of the combined pot of money, and the remainder of the money in the pot may be paid to the "winning" author. As noted, methods for paying judges can vary.

Creation of a Line of Authors and the Protection of Each Author's Rights

In the method above, royalties can depend on the contributions of previous answers, so the method inherently creates a line of authors for a given current answer.

If a challenger author receives a share of the royalties for an answer, he not only gets a share of the current author's royalties, but may also a share of the other authors in the line who also have royalty rights. For example, let us assume there is one other author in the author line, who has the right to receive 50% of the current answer's royalties. And let us assume that a challenger author supplies an improvement and claims 50% of the current answer's royalties. In this case, the challenger author will be diluting the other two authors in the line.

Therefore, the method above can include rules for enabling any author who is diluted by an improvement to challenge the challenger author's royalty claim for that improvement, just as the current author can challenge the claim.

I claim:

1. A method for ranking and improving answers supplied by users to an online database system, the method employing: an online computer database system for supplying and retrieving answers (answer DBS), this answer DBS including processors, memory, online input/output, software, and a user interface for:

creating user accounts, including accounts for funds
entering a question and supplying a corresponding answer
entering a question and retrieving a corresponding answer
entering a bet offer, directed at a specified user
accepting a bet offer
entering a bet decision,
the method comprising the following steps that the answer DBS executes:
a first author enters a question and supplies the first answer to that question, the answer DBS:
storing the answer to correspond to the question
designating the answer as the current answer, the current answer to be output in response to the question being entered by consumer users
designating the author as the current author
then, a second author enters the same question and supplies a different answer, the answer DBS:
storing the answer to correspond to the question
designating the answer as a challenger answer in relation to the current answer
designating the second author as the challenger author in relation to the current author and the current author's answer
requiring the second author to enter a bet offer, directed at the current author, claiming that the challenger author's answer is better than the current author's answer
registering the challenger author's bet offer
alerting the current author to the challenger author's bet offer
if the current author does not accept the bet offer, the answer DBS:
designating the challenger author's answer as the current answer and the challenger author as the current author
if the current author accepts the bet offer, the answer DBS:
registering the acceptance
alerting a judge to decide the bet
registering the judge's bet decision
if the judge finds that the current answer is better, the answer DBS maintaining the current answer as the current answer; if the judge finds that the challenger author's answer is better, then the answer DBS designating the challenger author's answer as the current answer and designating the challenger author as the current author.

2. The method of claim 1 in which the answer DBS includes steps for assigning royalties for the new current answer to the new current author.

3. The method of claim 1 in which the answer DBS includes steps for storing reasons, entered by an author, associated with a bet offer by the author, and for displaying those reasons with the author's corresponding answer and bet offer terms.

4. The method of claim 1 in which the answer DBS includes steps for enabling the current and challenger authors to solicit the opinions of consumer users before a bet agreement has been made regarding which answer is better, the current answer or the challenger answer.

5. The method of claim 1 in which the answer DBS includes steps for enabling either author in a bet agreement to retract their bet offer.

6. The method of claim 1 in which the answer DBS includes the following steps, executed when an author supplies a challenger answer to a current answer:
storing the answer to correspond to the question that the current answer corresponds to
designating the answer as a challenger answer in relation to the current answer, and the author as a challenger author, in relation to the current author
starting a submission deadline clock setting a time limit for additional answers by other authors to the same question
if any other authors submit answers to the same question, designating each of those answers as a challenger answer, and each of their authors as a challenger author
alerting each challenger author and the current author about all the answers supplied for the same question
requiring every challenger author to enter a bet offer claiming that his answer is better than the current answer and better than the other challenger answers
registering funds entered by the challenger author(s) to cover their bet offer(s)
when the submission deadline clock runs out, starting a bet acceptance deadline clock
if the current author does not accept the bet offer(s) then the answer DBS eliminating current answer from the answer competition
the answer DBS presenting the judge with the competing answers
upon the judge entering a decision as to which answer is best, the answer DBS:
storing the decision and designating the winning answer as the current answer, and the author of that answer as the current author.

7. The method of claim 1 in which the answer DBS includes steps for enabling any user of the answer DBS to bet on which competing answer will win in a bet controversy.

8. The method of claim 7, the answer DBS further:
creating a betting line regarding which answer will be judged best, generating said line from the bet offers and bet agreements made by users regarding which competing answer is best
dynamically designating the answer that is favored according to the betting line as the current answer, until such time as a judge decides which competing answer is best
upon the judge entering a decision as to which answer is best, the answer DBS storing the decision and designating the winning answer as the current answer, and the author of that answer as the current author.

9. An online database system for ranking and improving answers supplied by users, the system including: an online computer database system for supplying and retrieving answers (answer DBS), this answer DBS including processors, memory, online input/output, software, and a user interface for:

creating user accounts, including accounts for funds
entering a question and supplying a corresponding answer
entering a question and retrieving a corresponding answer
entering a bet offer, directed at a specified user
accepting a bet offer
entering a bet decision, the answer DBS executing the following steps:
a first author enters a question and supplies the first answer to that question, the answer DBS:
   storing the answer to correspond to the question
   designating the answer as the current answer, the current answer to be output in response to the question being entered by consumer users
   designating the author as the current author
then, a second author enters the same question and supplies a different answer, the answer DBS:
   storing the answer to correspond to the question
   designating the answer as a challenger answer in relation to the current answer
   designating the second author as the challenger author in relation to the current author and the current author's answer
   requiring the second author to enter a bet offer, directed at the current author, claiming that the challenger author's answer is better than the current author's answer
   registering the challenger author's bet offer
   alerting the current author to the challenger author's bet offer
if the current author does not accept the bet offer, the answer DBS:
   designating the challenger author's answer as the current answer and the challenger author as the current author
if the current author accepts the bet offer, the answer DBS:
   registering the acceptance
   alerting a judge to decide the bet
   registering the judge's bet decision
if the judge finds that the current answer is better, the answer DBS maintaining the current answer as the current answer; if the judge finds that the challenger author's answer is better, then the answer DBS designating the challenger author's answer as the current answer and designating the challenger author as the current author.

10. The system of claim 9 in which the answer DBS includes steps for assigning royalties for the new current answer to the new current author.

11. The system of claim 9 in which the answer DBS includes steps for storing reasons, entered by an author, associated with a bet over by the author, and for displaying those reasons with the author's corresponding answer and bet offer terms.

12. The system of claim 9 in which the answer DBS includes steps for enabling the current and challenger authors to solicit the opinions of consumer users before a bet agreement has been made regarding which answer is better, the current answer or the challenger answer.

13. The system of claim 9 in which the answer DBS includes steps for enabling either author in a bet agreement to retract their bet offer.

14. The system of claim 9 in which the answer DBS includes the following steps, executed when an author supplies a challenger answer to a current answer:
   storing the answer to correspond to the question that the current answer corresponds to
   designating the answer as a challenger answer in relation to the current answer, and the author as a challenger author, in relation to the current author
   starting a submission deadline clock setting a time limit for additional answers by other authors to the same question
   if any other authors submit answers to the same question, designating each of those answers as a challenger answer, and each of their authors as a challenger author
   alerting each challenger author and the current author about all the answers supplied for the same question
   requiring every challenger author to enter a bet offer claiming that his answer is better than the current answer and better than the other challenger answers
   registering funds entered by the challenger author(s) to cover their bet offer(s)
   when the submission deadline clock runs out, starting a bet acceptance deadline clock
   if the current author does not accept the bet offer(s) then the answer DBS eliminating current answer from the answer competition
   the answer DBS presenting the judge with the competing answers
   upon the judge entering a decision as to which answer is best, the answer DBS:
   storing the decision and designating the winning answer as the current answer, and the author of that answer as the current author.

15. The system of claim 9 in which the answer DBS includes steps for enabling any user of the answer DBS to bet on which competing answer will win in a bet controversy.

16. The system of claim 15, the answer DBS further:
   creating a betting line regarding which answer will be judged best, generating said line from the bet offers and bet agreements made by users regarding which competing answer is best
   dynamically designating the answer that is favored according to the betting line as the current answer, until such time as a judge decides which competing answer is best
   upon the judge entering a decision as to which answer is best, the answer DBS storing the decision and designating the winning answer as the current answer, and the author of that answer as the current author.

* * * * *